Oct. 22, 1935.  H. M. LOFTON  2,018,615
METER BOX
Filed Feb. 26, 1934  2 Sheets-Sheet 1
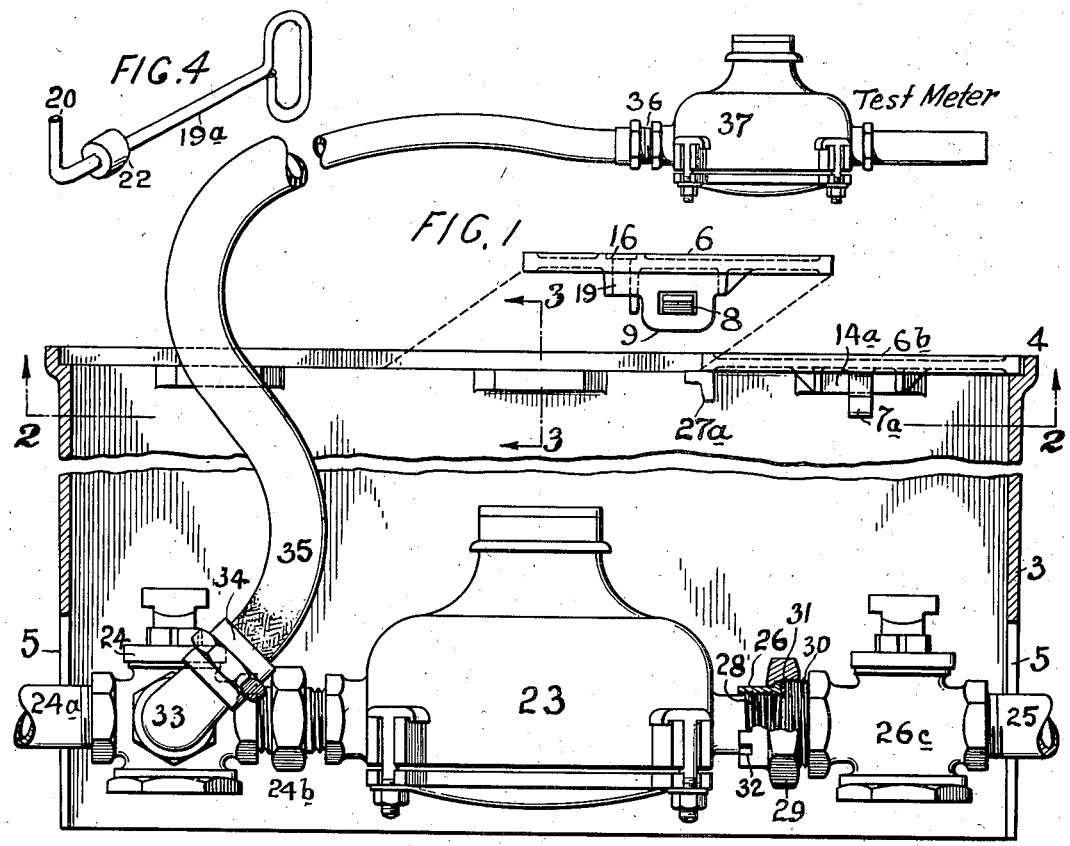
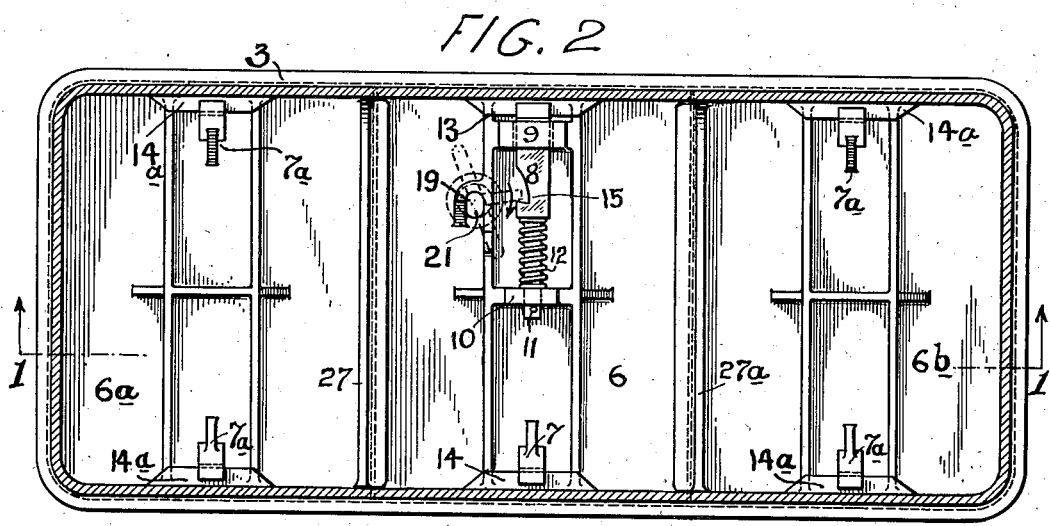
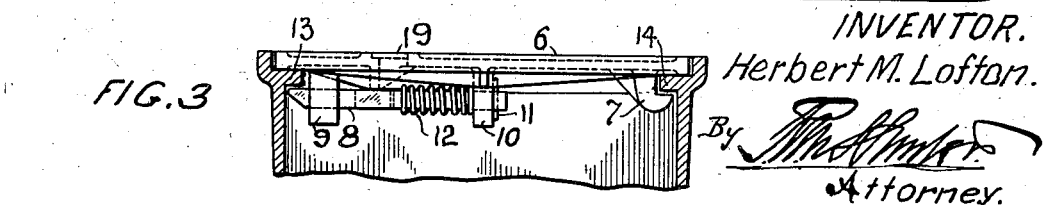
INVENTOR.
Herbert M. Lofton.
By
Attorney.

Oct. 22, 1935.  H. M. LOFTON  2,018,615
METER BOX
Filed Feb. 26, 1934   2 Sheets-Sheet 2
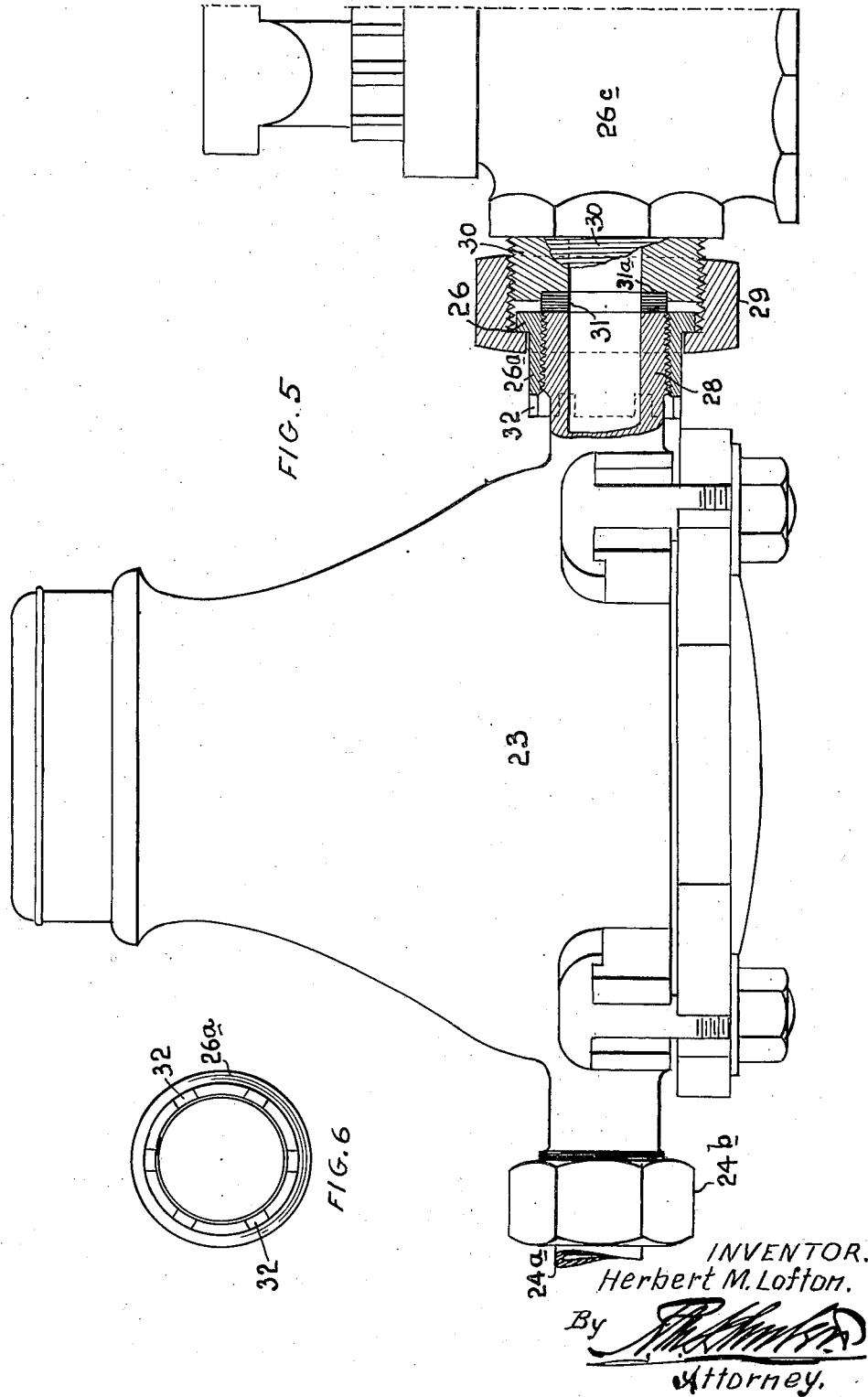
INVENTOR.
Herbert M. Lofton.
By
Attorney.

Patented Oct. 22, 1935

2,018,615

UNITED STATES PATENT OFFICE 2,018,615

METER BOX

Herbert M. Lofton, Chattanooga, Tenn.

Application February 26, 1934, Serial No. 712,970

5 Claims. (Cl. 285—3)

My invention has reference to meter boxes for use in connection with water mains for supplying water to factories, houses, and for other purposes, and also for measuring the quantity of water consumed.

My invention has for an object means for testing a meter which is located within a meter box, to determine its accuracy and wherein the testing is performed without removing the meter from the meter box and therefore without disturbing any of the meter connections with the supply and distributing pipes. In carrying out this part of my invention, I provide a hose connection with the discharge side of the service meter to be tested and which, after the house main or distributing pipe has been shut off, causes the water flowing through the meter to be tested to be passed through an accurate testing meter so that it is possible to observe the registrations simultaneously occurring on the service meter to be tested as well as on the test meter itself. In this manner, it is possible to make accurate tests upon meters in place and without the expense or difficulties incidental to the removal of the meters from the meter boxes and the pipe connections leading thereinto.

My improvements in the present application also relate to special forms of construction and installation whereby all of the working parts are housed within a single meter box provided with cover closures, which may be readily unlocked and removed for varying the extent of space made accessible in connection with the testing and other adjustments of the meter equipment.

My invention has a further object in providing coupling means for assembling the operative meter elements within a single meter box, which greatly reduces the space required in securing proper installation.

According to the invention, the meter, which has a threaded inlet extension and a supply valve which has a threaded outlet extension is coupled by means including an adapter comprising a tubular part screwed upon the inlet of the meter and provided at one end with means for permitting adjustment upon the meter inlet extension and at the other end with an annular flange, a union nut screwed upon the threaded extension of the supply valve to form a rotary casing with the adapter for moving it and the meter relatively toward the supply valve, said supply valve being provided with a counter-bore for receiving and holding a gasket of substantially the same diameter as the threaded inlet extension of the meter whereby upon adjustment of the union nut the said extensions will be sealed.

Referring to the drawing: Fig. 1 is a vertical section of the meter box structure on line 1—1 of Fig. 2; Fig. 2 is an inverted plan view on line 2—2 of Fig. 1; Fig. 3 is a transverse sectional view taken on line 3—3 of Fig. 1, but with the locking bolt and cover in position within the meter box; Fig. 4 is a perspective view of the key for unlocking the covers and permitting them to be lifted out of the meter box; Fig. 5 is a side elevation of a service meter and adapter for adjustably coupling the meter in operative position; and Fig. 6 is an end view of the adapter removed.

The meter box proper is indicated at 3 and its upper edge 4 is formed with a continuous channel adjacent said edge in which the cover plate 6 rests, as shown in Figs. 1 and 3. In Fig. 3, the flanged portion 4 of the meter box is provided at one end with a horizontal extension 14, and the cover plate 6 is provided with a lug 7 which extends inwardly and engages the said extension 14, as clearly shown. Similarly, on the other end of the meter box, there is provided an inwardly extending part or keeper 13 which is engaged by the locking bolt 8, the same being spring-actuated by a coil spring 12. This bolt 8 is guided through lugs 9 and 10 on the underside of the cover and may be beveled at its engaging end so as to snap under the inward keeper portion 13 when the cover is pressed downward upon the box, as will be understood by reference to Figs. 1, 2 and 3. A cotter pin 11 is extended through the bolt adjacent to the lug 19 and operates to hold the bolt against any abnormal action of the spring while at the same time permitting the bolt to be yieldably supported so that it may move longitudinally when operating to lock the cover in position upon the meter box.

By referring more specifically to Fig. 2, it will be seen that there is a vertical hole 19 through the cover but which is preferably elongated slightly as at 21. Moreover, this hole 19 is of a larger diameter at the top as indicated at 16. The end 20 of the key 19a is arranged to be inserted through the hole 19 and then turned so that it engages the shoulder formed by the notched portion 15 of the bolt, and whereby when turned in the direction of the arrow in Fig. 2, it operates to push the bolt 8 backward to release the locking engagement between the cover and the box. It is to be understood that during this operation of the key, the enlarged cylindrical portion 22 thereof is received in the cylindrical portion 16 in which it acts as a journal when being turned, said construction permitting easy insertion and removal of the key from the key hole. Furthermore, before the key has been withdrawn from the lock, it may be employed as a means for lifting the cover plate upward in the act of disengaging it for exposure of the service meter 23, the three-way distribution valve 24, and the curb cock 26c (connected with the meter), all within the meter box.

The meter box is notched at opposite ends, as indicated at 5, 5, for providing bridging spaces through which the house or distributing main 24a and street main 25 may extend. It will be noted that the adapter 26a may be secured in position with and between the meter 23 and the curb cock 26c. This adapter is intended to permit the use of the regular curb cock being placed in the same box with the meter and both maintained under lock. Here it should be understood that the regular meter couplings commercially furnished with the meter are long and, therefore, to use them would require a very much longer box in which to install the service meter and curb cocks than I employ. To overcome this, one of the coupling means is made adjustable, namely, that between the service meter inlet 28 and the curb cock or supply valve 26c, and more particularly designated as the adapter 26a in Figs. 1 and 5. This adapter 26a is internally screw threaded, preferably with a slight taper to insure a water tight joint, for connection upon the inlet extension 28 of the meter, and is provided about one end with milled slots 32 whereby it may be adjusted upon the inlet extension 28 by means of a "Spanner" wrench; and at its other end is provided with a shoulder 26 which is engaged by a coupling nut 29 screwed upon a special male thread extension 30 of the curb cock 26c. The adjustment of this coupling nut 29 causes the adapter to be moved toward or from the curb cock, thus shortening up the distance to the extent of several inches and permitting this installation to be made in a very much smaller meter box than would ordinarily be required. A rubber gasket 31 is inserted between the end of the inlet extension 28 of the meter and the extension 30 of the curb cock for making a water tight joint between the extension and curb cock, said gasket being supported with an annular space 31a in the extension 30 for normally holding it in assembling position as well as permitting a large amount of compression under the influence of the adapter 26a and coupling nut 29. There is an annular space about the gasket and between the adapter and extension 30 for assisting in effective compression of the gasket. In a general way, it may be said that this combined adapter and coupling mechanism is made in a compact form and embodies the principles of a special union between the curb cock and the inlet connection of the meter.

Referring again to Fig. 2, it will further be seen that the cover or closure means for the meter box in the case of the larger sizes of meters are made with means for unlocking a plurality of cover plates and permit shifting or moving them so that the said plates may be quickly and definitely removed or put out of action, such removal being performed in the following manner. The middle cover plate 6 has its locking bolt 8 thrown back and unlatched by the key 19a (Fig. 4), as previously described. Thereupon, one of the lateral cover plates 6a and 6b is shifted to disengage its lugs 7a from the extensions 14a, there being two such locking engagements. In this manner, the three cover plate sections may be entirely removed and a large open space provided for permitting access to be had between the cover plate sections and meter box. By this construction, I provide positive locking means for all sections of the cover and with the use of a single key and bolt mechanism for opening the same. In this structure, the cover plate sections 6a and 6b may be respectively provided with transverse girder ribs 27 and 27a for strength, as in Figs. 1 and 2. The lugs 7a which engage the flanges 14a correspond to the lugs 7 and engaging flanges or extensions 14 as in Fig. 3.

I have described a plurality of cover plates and the manner of opening them for inspection or repairs to the mechanism enclosed within the meter box, and I will now describe the construction and operation of the means for testing the meter 23, which is positioned within the meter box. Referring to Fig. 1, the water passes through the street main 25, curb cock 26c, and the adapter 26a to and through the meter 23, thence through the detachable connection 24b, the distributing valve 24, and the house main 24a. The valve 24 is a three-way stop cock arranged on the outlet side of the meter. In practice, the water meter is installed in the regular way with a curb or supply cock for delivering water to the intake port of the water meter, whereas the water which passes through the meter is delivered into the distributing main 24a under the control of the three-way cock 24, which is constructed to shut off the distribution of water or to direct it into the distributing main 24a or into a flexible hose section 35 into the inlet 36 of the test meter 37. The intake end of the hose 35 is coupled at 34 to a water outlet 33 of the control cock 24. The test meter 37 is coupled on its intake port 36 with the delivery end of the hose 35, the construction being such that when the three-way cock 24 is adjusted to deliver the water that is received from the meter 23 into and through the hose 35, the total quantity of water passing through the service meter 23 is measured by the test meter 37. The amount of water which passes through the later during any period of time indicates the amount of water which is passing through the service meter 23. In this way, the service meter 23 may be accurately tested and the amount of water indicated on the test meter will necessarily be the amount of water which should pass through the service meter 23. It will be manifest that this test is made without disturbing any of the internal structures of the meter box. All that is necessary is to unlock the cover plate 6 and lift it clear of the meter box, as indicated in Fig. 1; and if additional room is required for access to the meter box, one or both of the other cover plates 6a and 6b are shifted along the channel 4 and likewise removed. After removing the cover plates, one end of the hose section 35 is coupled to the port 33 of the three-way distributing valve 24 while the other end of the hose is coupled with the inlet of the test meter 37; after which, the three-way stop cock 24 is given a quarter turn to shut off the water from the premises and direct it through the test meter. It will now only be necessary to compare the readings on the service meter 23 and the test meter 37 over the same period of time. If the test meter has been accurately made and shows the passage of the same amount of water that is shown on the service meter 23, it will be evidence that the service meter is accurate and in proper working order. Any other reading will indicate the passage of too much or too little water and in that manner indicate any defect which may exist in the service meter. After the test is made, it is only necessary to disconnect the hose 35 and remove it, together with the test meter, then turn the distributing valve 24 back to supply the water to the distributing means 24a, and finally to replace the cover plates in their proper position upon the meter box as indicated.

To remove the meter for repairs or other purposes, it is only necessary to shut off the water by the curb cock 26c, disconnect the coupling 24b from the house main 24a, and detach the adapter 26a after loosening the union nut 29, whereupon the meter with the adapter attached may be removed from the meter box.

Of course the meter box and equipment therein as illustrated in the drawings may be modified and changed in various ways without departing from the invention herein set forth and hereafter claimed.

The invention is hereby claimed as follows:

1. Coupling means for a service meter having a threaded inlet extension, combined with a supply valve having a threaded outlet extension, comprising an adapter means for adjustably coupling the service meter to the supply valve, said adapter means comprising a tubular part screwed upon the inlet of the meter and provided at one end with means for permitting adjustment thereon and at the other end with an annular flange, a union nut screwed upon the threaded extension of the supply valve to form a rotary engagement with the adapter for moving it and the meter relatively toward the supply valve, and an annular gasket arranged between and abutting the inlet extension of the meter and the threaded extension of the supply valve.

2. Coupling means for a meter having an extension inlet and a supply valve, comprising an adapter means for connecting the meter inlet extension with the supply valve, said adapter means comprising a tubular part screwed upon the inlet extension of the meter for supplementing the said inlet extension, an annular gasket arranged between and abutting the supply valve extension and the inlet extension of the meter, and adjustable means coupling the adapter and the supply valve together whereby the adapter and the meter inlet extension may be relatively adjustable toward or from the valve and for supplying compression to the gasket for all positions of adjustment of the adapter.

3. Coupling means for a service meter having a threaded inlet extension, combined with a supply valve having a threaded outlet extension, comprising an adapter means for adjustably coupling the service meter to the supply valve, said adapter means comprising an internally threaded tubular part adapted to engage the inlet extension of the meter and provided at the one end with means for permitting adjustment upon the meter inlet extension and at the other end with an annular flange, a union nut screwed upon the threaded extension of the supply valve to form a rotary engagement with the adapter for moving it and the meter relatively toward the supply valve, a counter-bore in the valve extension and a gasket fitting into said counter-bore and adapted to abut the meter inlet extension and seal the passage between said valve and meter when the union nut is adjusted.

4. Coupling means for a meter having an extended inlet and a supply valve having an extended outlet, comprising an annular gasket arranged between and abutting the extensions of the meter and valve to make a liquid tight joint, clamping means for clamping the gasket in position and including a tubular adapter attached to the meter and a union nut for drawing the adapter toward the supply valve.

5. Coupling means for a service meter having a threaded inlet extension combined with a supply valve having a threaded outlet extension, comprising an adapter means for substantially coupling the service meter to the said adapter, means comprising a tubular part screwed upon the inlet of the meter and provided at one end with means for permitting adjustment thereon and at the other end with an annular flange, a union nut screwed upon the threaded extension of the supply valve to form a rotary engagement with the adapter for moving it and the meter relatively toward the supply valve, said valve extension provided with a counter-bore whose outer diameter is approximately the same as the outer diameter of the meter extension and slightly less than the internal threaded diameter of the adapter, and a gasket in said counter-bore for sealing the connection between said extensions when said union nut is adjusted.

HERBERT M. LOFTON.